United States Patent [19]

Liaw

[11] Patent Number: 4,918,567
[45] Date of Patent: Apr. 17, 1990

[54] MOVING CORONA DISCHARGING APPARATUS

[75] Inventor: Chiu-Fong Liaw, Hsin Chu Hsien, Taiwan

[73] Assignee: Industrial Technology Research Institute, Hsin Chu Hsien, Taiwan

[21] Appl. No.: 281,068

[22] Filed: Dec. 8, 1988

[51] Int. Cl.⁴ .............................................. H01F 1/02
[52] U.S. Cl. .................................... 361/229; 250/326; 118/638; 427/39; 427/100; 29/25.35
[58] Field of Search .............. 361/225, 229, 230, 233, 361/235, 213, 212; 250/324, 325, 326; 118/638; 427/39, 100; 29/25.35; 307/400; 55/149, 140; 422/186.26; 219/124.1

[56] References Cited

U.S. PATENT DOCUMENTS

| | | | |
|---|---|---|---|
| 2,344,534 | 3/1944 | Bucknam et al. | 219/124.1 X |
| 3,978,380 | 8/1976 | Talmage | 361/229 |
| 4,327,153 | 4/1982 | Micheron | 428/421 |
| 4,365,283 | 12/1982 | Radice | 361/233 |
| 4,392,178 | 7/1983 | Radice | 361/233 |

Primary Examiner—Todd E. Deboer
Assistant Examiner—David Osborn
Attorney, Agent, or Firm—Cushman, Darby & Cushman

[57] ABSTRACT

A new type of corona discharging apparatus. The apparatus revealed is equipped with a pair of thin electrodes which are edge-to-edge parallelly arranged, and between them is an air gap. It is characteristic of this apparatus that the equipped electrodes are allowed to reciprocate along a definite path within a desired distance. By using the apparatus, corona discharge on polymer film can be performed, either in a still or moving state, for a considerable length of time without causing dielectric breakdown. One of the practical applications of this invention is poling of stretched PVDF (polyvinylidene flouride) films to gain high piezolelectric activity with high production yield.

6 Claims, 1 Drawing Sheet

MOVING CORONA DISCHARGING APPARATUS

BACKGROUND OF THE INVENTION

The present invention relates to a new type of corona discharging apparatus. In a more detailed description, the apparatus is equipped with a pair of thin plate electrodes. It is characteristic of this apparatus that the equipped electrodes are allowed to reciprocate along a definite path within a desired distance. By using the apparatus, it is able to perform corona discharge on polymer film, either in a still or moving state, for a considerable length of time without causing dielectric breakdown. One of the practical applications of the apparatus is poling of stretched PVDF (Polyvinylidene fluoride) films to gain high piezoelectric activity with high production yield.

Generally speaking, the process for manufacturing piezo-electric PVDF films is based on the poling of stretched PVDF films. Of the currently known poling techniques, the most widely employed methods are thermal contact and corona discharge, as disclosed in Chinese patent No. 32963 and in U.S. Pat. Nos. 4,365,283 and 4,392,178. Thermal contact method consists of the application of a DC electrical field to a film inserted between the surface electrodes while the assembly is heated and finally cooled to ambient temperature; the corona discharge method charges the polymer film by application of a DC voltage of a few KV between a needle or knife electrode and a back electrode located behind the film. Between the two methods, corona poling is comparatively much easier to do because it requires shorter times and can be performed at room temperature.

In the conventional corona discharging apparatus, one of the electrodes is usually of roller type. The apparatus may carry out poling continuously, and poling time is dependent on rolling speed of the roller electrode. However, there is a disadvantage that the rolling speed or film feeding speed is not easily controllable, too fast a speed may reduce the film piezoelectric activity owing to insufficient poling, while too slow a speed may cause the film to undergo dielectric breakdown due to high field strength. Thus, piezoelectric film having both high quality and high production yield is not achieveable by the conventional poling techniques.

SUMMARY OF THE INVENTION

The corona discharge is a technique frequently employed in polymer films fabrications for purposes like modification of film properties of low-density polyethylene (LDPE), high-density polyethylene (HDPE), polypropylene (PP), and other nonpolar polymers to make the surface more receptive to printing; poling of polymer films to align the molecular dipoles to exhibit piezoelectric activity etc. In the latter, though many polymers can be made to show piezoelectric activity, the largest response so far has been from PVDF and some of its copolymer. Thus, PVDF provides a good example illustrating the poling behavior.

PVDF is a long chain polymer of the repeat unit $(CH_2CF_2)_n$. Presently, four crystalline forms referred to as forms I, II, III, and $II_p$, or $\beta$, $\alpha$, $\gamma$, and $\alpha_p(\delta)$, respectively, are known. When PVDF is initially extruded to film, the non-piezoelectric, non-polar $\alpha$-phase predominates. Since it is known that high piezoelectric response is associated with the polar $\beta$ phase (which shows the maximum dipole moment per unit cell), and mechanical orientation of the film at elevated temperature may cause partial transformation of $\alpha$ phase to $\beta$ phase, a typical process for preparing piezoelectric PVDF film generally consists of the following steps: (1) stretching (2) electroding and (3) poling. Stretching an extruded PVDF raw film at a ratio 3-6:1 and at temperatures 90°-130° C. may effectively recrystallize the molecular form from a nonpolar $\alpha$ phase to a polar $\beta$ phase, and poling the stretched and electroded film by high DC electrical field may align the randomly oriented molecular dipoles normal to film surface yielding practical piezoelectric response.

As mentioned earlier, poling is usually carried out by either thermal contact or corona discharge. Though corona method is comparatively much easier to do, by the conventional corona discharge apparatus it is still difficult to obtain piezoelectric films showing both high quality and high production yield simultaneously. Basically, to achieve a high piezoelectric activity with high production yield, the stretched PVDF films should be poled by an electrical field as high as possible for a considerable length of time without dielectric breakdown. Based on this principle, moving corona discharging apparatus is invented to solve the said problem.

In this invention, corona discharge apparatus is equipped with a pair of thin plate electrodes. The main feature is that the electrodes are allowed to reciprocate along a definite path within a desired distance for preforming corona discharge forward and backward repeatedly. Experimental results show that when the electrodes reciprocate over the film surface, corona discharge performs continuously without dielectric breakdown. The said apparatus consists of several parts including: (1) a pair of thin plate electrodes; a platform; two parallel metal rods; and a driving motor; the electrodes being fixed on the platform. The platform is allowed to reciprocate along a path within a desired distance. Motion of platform is driven by two parallel, screwed metal rods and a motor. Gap distance of electrodes and moving speed of platform are adjustable for regulating electrical field strength (MV/m) and poling time (sec/cm), respectively. The apparatus further includes (2) a DC high voltage regulator: used to generate a DC electrical field between the gap of two electrodes. Also the apparatus includes (3) Sample holders; the sample subject to corona discharge is held either in a still or a continuously moving state.

In summary, this invention, the moving corona discharging apparatus shows the following characteristics:

(1) Novelty: Corona discharging apparatus consisting of reciprocating thin plate electrodes is a novel design that has never been found in any literature or patent literature.

(2) Economics: Because of simple structure, this apparatus is economical and easy to maintain.

(3) Practicality: This apparatus shows excellent poling behavior for producing high piezoelectric response PVDF films with high production yield.

DETAILED DESCRIPTION

Figure 1:
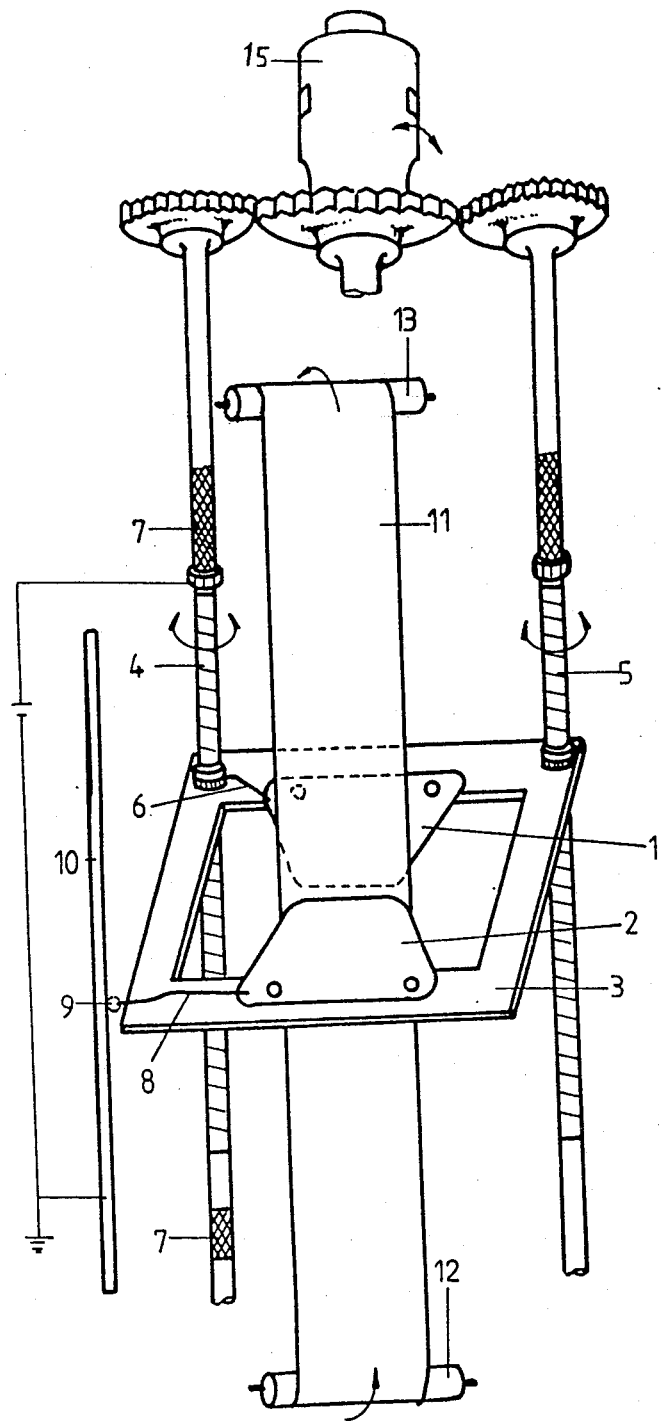
FIG. 1 shows the structure of moving corona discharging apparatus.

The present invnetion relates to a new type of corona discharging apparatus. In a more detailed description, the apparatus is equipped with a pair of thin plate electrodes. It is characteristic of this apparatus that the equipped electrodes are allowed to reciprocate along a definite path within a desired distance. By using the apparatus, it is able to perform corona discharge on polymer films, either in still or moving state, for a considerable length of time without causing dielectric breakdown.

FIG. 1 shows the structure of this invention. Its operational principle is as follows:

1. A pair of thin electrodes (1) and (2) are fixed to an insulating platform (3). Gap distance of the two electrodes is adjustable from 1 to 15 mm, and width of the gap is normally less than 60 cm.

2. The platform (3) is allowed to move reciprocally with speed about 3–20 cm/min. induced by the rotation of screwed metal bars (4) and (5), which are driven by a motor (15). The moving distance of electrodes can be adjusted to cover the desired poling area.

3. Electrode (1) is a positive electrode formed by connecting it to the positive end of a DC high voltage regulator through cable wire (6) and metal bar (4). The high voltage system is insulated from other parts by insulators (7).

4. Electrode (2) is a ground electrode formed by connecting it to the ground end of the DC high voltage regulator through cable wire (8), wheel (9), and metal bar (10).

It should be noted that according to the primary invention idea, dimension of the apparatus is not essential, and actually it may be adjusted to fit the user's requirement.

The operation procedures are as follows:

1. Film holders (12) and (13) hold stretched PVDF film (11) in tension to a position just between, but not in contact with, the two electrodes (1) and (2).

2. Subsequently, DC high voltage, moving distance and moving speed of electrodes, are properly regulated and the film is poled to a desired time.

To illustrate function of this invention, some typical experimental results on poling of stretched PVDF films by using this invention are given below as example. From the results, it is seen that when the stretched PVDF films are properly poled at room temperature, piezoelectric films with high piezoelectric constant ($d_{31}$) and high production yield are readily obtainable.

EXAMPLE

A commercially available polyvinylidene fluoride raw film was mechanically stretched 3–6 times its original length at 90°–130° C., followed by thermal deposition a thin layer of aluminum or silver on each side of film as electrode. Subsequently, the film was poled by the invented moving corona discharging apparatus, and piezoelectric constant ($d_{31}$) of the resulted film was measured. Typical poling conditions and the resulted $d_{31}$ are summarized in table 1.

TABLE 1

| The poling conditions and piezoelectric constant of PVDF films | | |
|---|---|---|
| Electrical field strength (MV/m)* | Poling time (sec)** | Piezoelectric const. d (pC/N) |
| 65 | 258 | 13.8 |
| 65 | 542 | 17.7 |
| 65 | 774 | 21.9 |
| 65 | 1032 | 21.7 |

*Gap of electrodes = 2.4 mm
Field strength = (Applied voltage, MV) ÷ (Film thickness, m)

I claim:

1. A corona discharging apparatus comprising:
   a DC high voltage regulator;
   a pair of thin electrodes arranged edge-to-edge, said electrodes having an adjustable air gap separating them;
   a polymer film inserted in said gap, said electrodes being reciprocally movable along said film within a predetermined distance for performing corona discharge, said corona discharge caused by an electric field generated in said air gap by connecting one of said thin electrodes to said voltage regulator and grounding the other thin electrode;
   an insulating platform for supporting said electrodes; and
   a pair of threaded metal bars for supporting the platform, said bars driven by a motor causing said bars to rotate in both a clockwise and a counterclockwise direction and thereby inducing said platform and electrodes to reciprocate along said film.

2. The apparatus as claimed in claim 1, wherein said air gap is in the range from 1 to 15 mm.

3. The apparatus as claimed in claim 1, wherein said air gap has width of no more than 60 cm.

4. The apparatus as claimed in claim 1, wherein said platform reciprocates at a speed in the range from 3 to 20 cm/min.

5. The apparatus as claimed in claim 1, wherein said film comprises stretched polyvinylidene fluoride film.

6. The apparatus as claimed in claim 1, wherein said film is inserted between, but does not touch, said electrodes.

* * * * *